Oct. 18, 1938.  W. S. SAUNDERS  2,133,577
BATTERY INSTALLATION
Filed June 18, 1937  2 Sheets-Sheet 1
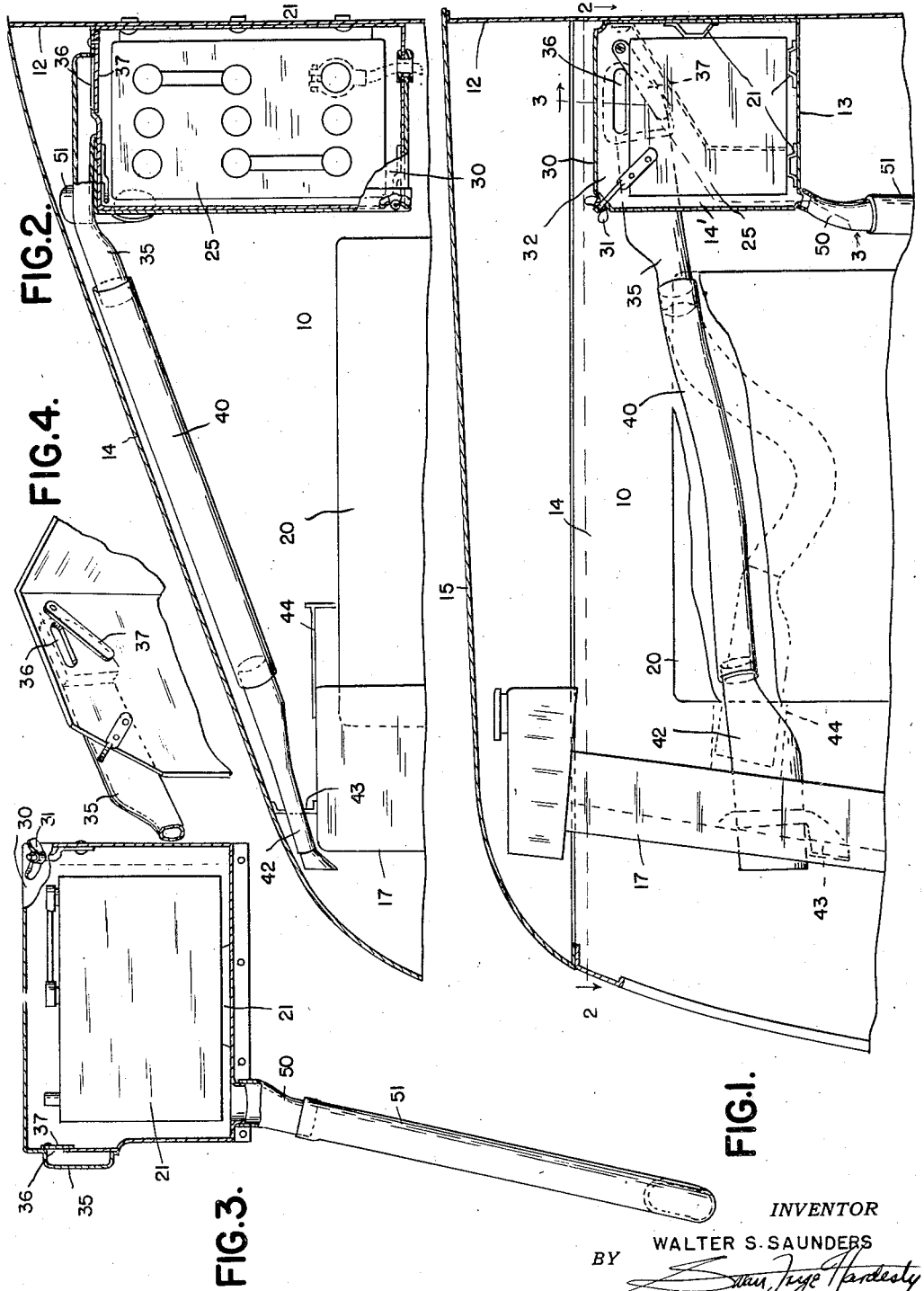
INVENTOR
WALTER S. SAUNDERS
BY 
ATTORNEYS Oct. 18, 1938. W. S. SAUNDERS 2,133,577
BATTERY INSTALLATION
Filed June 18, 1937 2 Sheets-Sheet 2

INVENTOR.
WALTER S. SAUNDERS
BY
ATTORNEYS

Patented Oct. 18, 1938

2,133,577

UNITED STATES PATENT OFFICE 2,133,577

BATTERY INSTALLATION

Walter S. Saunders, Pontiac, Mich., assignor to The American Forging & Socket Company, Pontiac, Mich., a corporation of Michigan Application June 18, 1937, Serial No. 148,886

3 Claims. (Cl. 180—68.5)

This invention relates to battery installations, particularly for vehicles. An important object of the invention is the provision of improved means whereby a battery for supplying current to the various electrical appurtenances of an engine may be economically installed in a position close to the engine and to such electrical appurtenances, yet shielded against the injurious effects of waste heat developed by the engine.

Another important object of the invention comprises the provision of an improved battery installation of the character indicated incorporating a ventilated box-like enclosure for the battery, and duct means of flexible character for conducting air thereto, the duct means being movable to change the position of the air intake, as well as to enable the use of the same structure in conjunction with vehicles having appurtenant parts differently proportioned.

A further object is to provide such a vehicular battery installation in which the box-like enclosure for the battery constitutes both shrouding means for directing air over the battery, and a protecting wall shielding the battery against direct access of heat developed by the engine.

Still another object is the provision of such an improved ventilated battery installation adapted to be arranged close to the engine of a vehicle and at least partly within the engine compartment of a vehicle and incorporating a movable air inlet, whereby air for ventilation may be taken either from a heated or from an unheated source, in accordance with climatic or weather conditions.

A further object is the provision in such an improved vehicular battery installation of a battery box having a lid opening into the engine compartment and enabling servicing and removal of the battery therethrough, said lid being provided with latching means normally preventing removal of the lid from within the battery compartment, the latching means being releasable only from within the passenger compartment.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a vertical sectional elevation showing somewhat diagrammatically the engine hood and appurtenant parts of a motor car provided with a front mounted engine and equipped with a battery installation incorporating the principles of this invention.

Figure 2 is a sectional plan view taken substantially on the line 2—2 of Figure 1 and looking in the direction of the arrows.

Figure 3 is a vertical section taken substantially on the line 3—3 of Figure 1 and looking in the direction of the arrows.

Figure 4 is a detailed perspective view of a portion of the interior of the battery box, with the battery removed, showing the intake damper.

Figure 6:
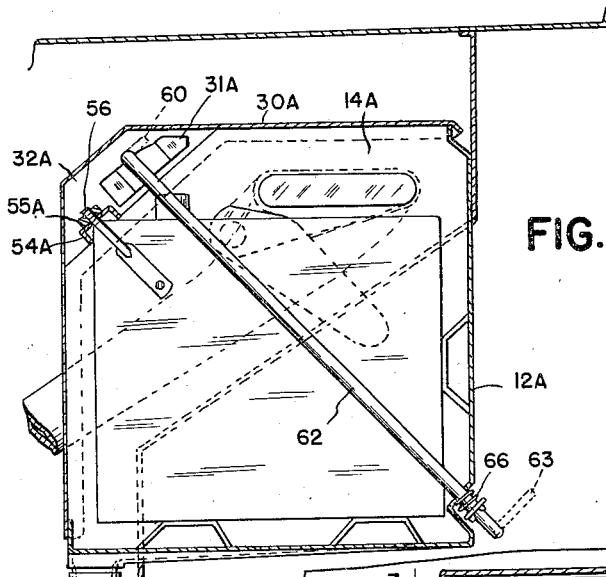
Figure 5:
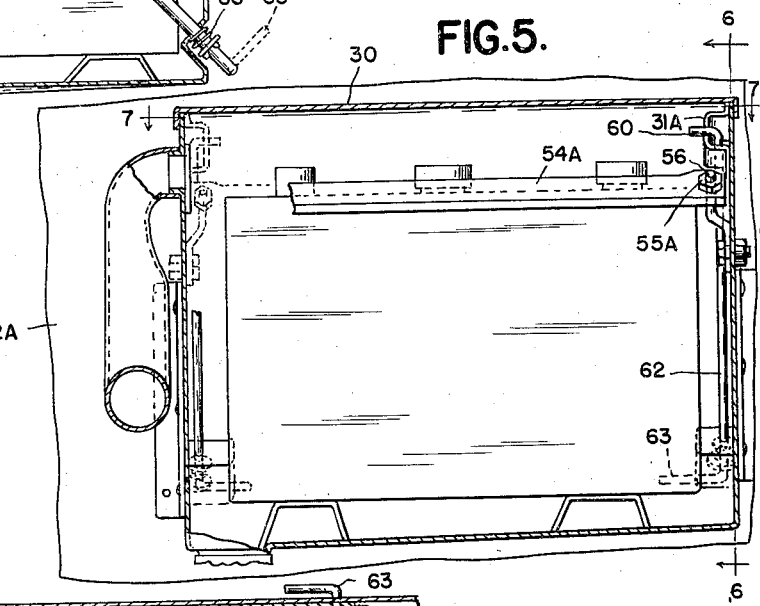
Figure 5 is a longitudinal sectional elevation, similar to Figure 3, of a somewhat modified construction.
Figure 7:
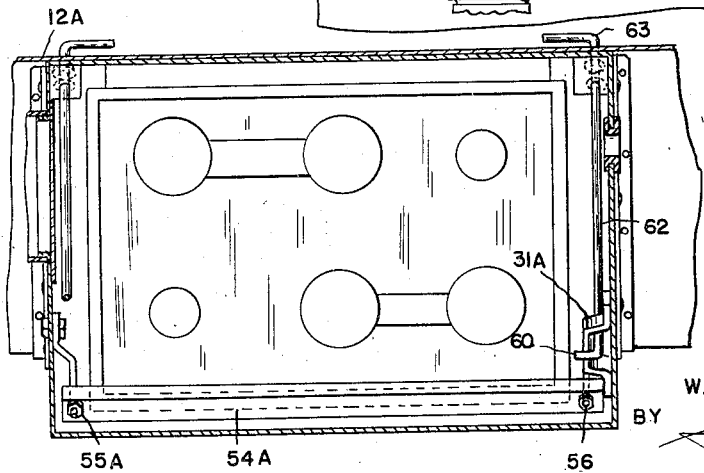

Figures 6 and 7 are transverse sections taken substantially on the lines 6—6 and 7—7 respectively of Figure 5, and looking in the direction of the arrows.

Referring now to the drawings, reference character 10 designates the engine compartment of a motor car, which is only fragmentarily shown. The engine compartment is separated by a dash panel 12 from a passenger compartment located directly behind the same and not indicated in the drawings. The other walls of the engine compartment are defined by fixed side panels 14 and a lid 15, together with a radiator 17 located at the front. A portion of the dash panel 12 is indented to provide a shelf-like support 13 for the battery, which is preferably elevated slightly thereabove as upon brackets 21 to allow free air circulation about the battery, similar brackets being provided to hold the battery spaced from the side and back walls. Supplementary side panels 14' meet and project outwardly from the sides of the indented portion to complete the side walls of a box-like enclosure of sufficient size to receive the battery 25. A cover section 30 preferably forms the entire front and top walls of the box, so that when the cover is removed, the battery is readily accessible through the engine compartment for replacement or servicing, while when in place, the cover completes a relatively tight enclosure preventing direct access to the battery of air which has been heated by passing through the radiator and over the engine.

The front upper corners of the side panels 14 are somewhat cut away, to facilitate access to the battery when the cover is removed, gusset sections 32 being incorporated in the cover at such corners to fit such cut away sections of the side panels, as best appears in Figures 1 and 4. In Figures 1 to 4 inclusive the cover is shown as held in place by wing nuts 31 screwed upon and readily removable from studs riveted or otherwise secured to and projecting upwardly and forwardly from the side panels 14, and through the upper front corners of the cover.

A sheet metal inlet elbow 35 extends into the side of the battery box, and the opening 36 into the box is adapted to be closed by a swingable sheet metal damper 37. To the elbow 35 is connected a flexible inlet duct 40 which extends forwardly beside one of the side panels 14 of the hood to connection with a flared sheet metal inlet section 42, such inlet having its mouth opening forwardly of the radiator 17 in order that air entering the same and conducted to the box may be taken from the unheated stream of air which has not reached the radiator. The radiator does not extend entirely across the front of the hood, allowing the inlet duct to pass around the side of the radiator, as shown. A bracket 43 is secured to the radiator and side panel 14 to support the inlet mouth portion 42.

By virtue of the provision of the flexible section 40, it will readily be apparent that when, as in cold weather, it may become desirable to supply heated rather than unheated air to the battery, it is only necessary to remove the mouth portion 42 from the bracket 43 and locate such mouth in a position to take air which has been heated by the radiator and/or engine, as by attaching the same to a supplementary bracket as 44 secured to the side of the radiator and adapted to similarly hold the mouth in position directly behind the radiator in such manner that it may intercept air which has been heated by passing through the radiator.

An air outlet portion 50 is connected to the bottom of the box, and preferably formed at least partly by another flexible tube section 51 extending downwardly to discharge the air from the box at a point below the passenger compartment.

In the modified constructions shown in Figures 5, 6 and 7, in which parts equivalent to those previously described are designated by like reference characters distinguished by the addition of the letter "A" to each, the cover portion 30A similarly forms the entire top and front of the box, likewise arranged in and partly formed by indentation of the dash panel 12A. The battery is adapted to be secured in place by a channel iron 54A releasably clamped over its top front corner by a pair of nuts 55A secured upon studs 56 projecting upwardly and forwardly from the side panels. In this embodiment such studs do not hold the cover in place. The cover is provided with double bent keeper brackets 31A welded or otherwise suitably secured to the interior of the gusset sections 32A and inaccessible from the outside when the cover is in place. The brackets are adapted to be held, to secure the lid in place, by swingable holding arms 60, integrally formed as laterally bent ends of a pair of rods 62, projecting angularly rearwardly and downwardly therefrom inside and close to the side walls of the box, and through the dash panel 12A into the passenger compartment, where each rod is provided with a laterally bent portion 63 forming an operating handle by which it may be turned to swing the arm 60 to and from overengaging latched relation with respect to its appurtenant bracket 31A. The upper edges of the keeper brackets are preferably inclined in such fashion that the cover is drawn into place by the holding arms as the latter are swung thereover, a desired pressure being insured and rattling prevented by springs as 66 carried by the rods on the passenger compartment side of the dash panel and tending to draw the rods downwardly.

What I claim is:

1. In combination with an automotive vehicle having an engine compartment, an engine in said compartment which develops waste heat in operation, said engine incorporating electrically operable elements, a battery for supplying current to said electrically operable elements, a box-like enclosure for said battery having at least one wall exposed to the interior of said engine compartment, and means for ventilating said battery enclosure comprising a flexible air inlet conduit connected to an inlet opening formed in said enclosure, said conduit having a mouth portion adapted to be selectively positioned either in advance of or behind a portion heated by the engine, said enclosure also having an air outlet.

2. In combination with an automotive vehicle having an engine compartment, an engine in said compartment which develops waste heat during operation, said engine incorporating electrically operable elements, a battery for supplying current to said electrically operable elements, a box-like enclosure for said battery, said enclosure having air inlet and outlet openings and having at least one wall exposed to the interior of said engine compartment, and means for ventilating said battery enclosure comprising an air conductor connected to said air inlet and having a movable portion enabling the same to take air either from a position behind a portion heated by the waste heat of the engine, or to take unheated air from a position at which the air has not passed over such heated portions.

3. In combination with an automotive vehicle having an engine compartment, an engine in said compartment which develops heat during operation, said engine incorporating electrically operable elements, a battery for supplying current to said electrically operable elements, a box-like enclosure for said battery, said enclosure having air inlet and outlet openings and having at least one wall exposed to the interior of said engine compartment, and means for ventilating said battery enclosure comprising an inlet conduit having a portion movable to establish its mouth either behind a part heated by the engine, to take air which has been warmed thereby, or in a position to take unheated air which has not passed over a part heated by the engine.

WALTER S. SAUNDERS.